US010215660B1

(12) United States Patent
Kraft et al.

(10) Patent No.: US 10,215,660 B1
(45) Date of Patent: Feb. 26, 2019

(54) EROSION SENSOR AND SYSTEM, METHOD, AND COMPUTER PROGRAM PRODUCT THEREOF

(75) Inventors: William Kraft, Forest Hill, MD (US); Leszek S. Basak, Nottingham, MD (US); Timothy R. Fouts, Washington, DC (US)

(73) Assignee: Lockheed Martin Corporation, Bethesda, MD (US)

( * ) Notice: Subject to any disclaimer, the term of this patent is extended or adjusted under 35 U.S.C. 154(b) by 1101 days.

(21) Appl. No.: 13/294,015

(22) Filed: Nov. 10, 2011

(51) Int. Cl.
| G01B 3/44 | (2006.01) |
| G01B 3/52 | (2006.01) |
| G01B 5/28 | (2006.01) |
| G01B 5/30 | (2006.01) |
| G01M 5/00 | (2006.01) |
| G01M 99/00 | (2011.01) |
| G05B 19/4065 | (2006.01) |
| G05B 23/02 | (2006.01) |

(52) U.S. Cl.
CPC ........ *G01M 5/0033* (2013.01); *G01M 99/007* (2013.01); *G05B 19/4065* (2013.01); *G05B 23/02* (2013.01)

(58) Field of Classification Search
CPC .............. G01M 5/0033; G01M 99/007; G05B 19/4065; G05B 23/02
USPC .................................................... 702/34, 35
See application file for complete search history.

(56) References Cited

U.S. PATENT DOCUMENTS

| 4,328,462 A | 5/1982 | Jensen |
| 4,642,557 A | 2/1987 | Ross |
| 4,768,373 A | 9/1988 | Spencer |
| 4,884,434 A | 12/1989 | Satake et al. |
| 2003/0171691 A1* | 9/2003 | Casscells, III ....... A61B 5/0075 600/549 |
| 2007/0163325 A1 | 7/2007 | Radzisewski et al. |
| 2007/0207069 A1* | 9/2007 | Kariya et al. ............ 422/179 |
| 2007/0282541 A1* | 12/2007 | Griess et al. ............ 702/34 |
| 2010/0015889 A1* | 1/2010 | Shimizu et al. ............ 451/5 |
| 2011/0037983 A1 | 2/2011 | Davies |
| 2012/0201656 A1* | 8/2012 | Johnston ............ F01D 21/003 415/118 |

OTHER PUBLICATIONS

Henderson et al., "Comparison of the Ablative Materials in a Solid Rocket Motor Flow Field", Aug. 1979.*

* cited by examiner

*Primary Examiner* — Michael P Nghiem
(74) *Attorney, Agent, or Firm* — Miles & Stockbridge PC

(57) ABSTRACT

Erosion sensors and systems, methods, and computer products thereof are operative to determine and provide real time erosion data. Such data may be used to determine in real time an amount of erosion or ablation on an ablative surface, for instance, of a rocket or missile launch pad, of an exhaust management system, of an extraterrestrial vehicle, or of a fire detection system.

15 Claims, 10 Drawing Sheets

EROSION SENSOR AND SYSTEM, METHOD, AND COMPUTER PROGRAM PRODUCT THEREOF

Embodiments of the present invention generally relate to erosion sensors and systems, methods, and computer products thereof, useful for detecting or responding to erosion caused by a force (such as high temperature, high pressure exhaust) other than mechanical friction. In particular, some embodiments include an erosion sensor suitable for use in a missile launching system, and systems, methods, and computer products thereof.

Disclosed embodiments include a method comprising: electronically receiving in real time a first plurality of return signals indicative of amounts of actual erosion caused by a force other than mechanical friction; and automatically calculating values for amounts of actual erosion based on said receiving, said calculating producing erosion data.

Included among embodiments also is an ablation detection system for detecting ablation caused by high temperature, high pressure exhaust, comprising: at least one device configured to have decreasing return signal output characteristics based on an amount of ablation sustained thereto due to exposure to the high temperature, high pressure exhaust; and a receiver to detect return signal output characteristics from said at least one device, the return signal output characteristics being indicative of the amount of ablation sustained by said at least one device due to exposure to the high temperature, high pressure exhaust.

Embodiments of the disclosed subject matter also include a hot-launch missile vertical launching system (VLS) of a naval vessel, comprising: a plurality of vertical missile launch cells, each said launch cell configured to house one or more missiles for hot-launching; a gas management system (GMS) operatively coupled to said launch cells, said gas management system being configured and operative to output heat and exhaust gas from a hot-launched missile, said gas management system including a plenum portion and an uptake portion, said uptake portion having an output portion to outside the vertical launching system, each of said uptake and plenum portions having ablative insulator portions thereof; a control unit; and an erosion sensing system operatively coupled to said control unit. The erosion sensing system can include: a plurality of fiber-optic sensors flush embedded into a front face of each of said ablative insulator portions of said uptake and plenum portions, each of said fiber-optic sensors including a body made of ablative material and having embedded therein portions of a plurality of fiber-optic cables; and a transceiver operatively coupled to inputs and outputs of each of said plurality of fiber-optic sensors, said transceiver being operative to send light to inputs of each of said plurality of sensors and to determine an amount of light received from outputs of each of said plurality of sensors. The transceiver may be operative to calculate in real time, based on the amount of received light, an amount of erosion associated with each of said fiber-optic sensors.

Embodiments also include a missile vertical launching system (VLS), comprising: a vertical missile launch cell configured to house a missile for launching; a gas management system (GMS) operatively coupled to said launch cell, said gas management system being configured and operative to output heat and exhaust gas from a launched missile, said gas management system including a plenum portion and an uptake portion, said uptake portion having an output portion to outside the vertical launching system, each of said uptake and plenum portions having ablative insulator portions thereof; a control unit; and an erosion sensing system operatively coupled to said control unit. The erosion sensing system includes: a sensor flush embedded into a front face of each of said ablative insulator portions of said uptake and plenum portions, each of said sensors including a body portion made of ablative material and having embedded therein portions of a plurality of optical waveguides; and a transceiver operatively coupled to outputs of each of said plurality of sensors, said transceiver being operative to determine an amount of light received from outputs of each of said plurality of sensors. The transceiver is operative to calculate in real time, based on the amount of received light, an amount of erosion associated with each of said sensors.

Embodiments also include computer program products or non-transitory computer readable media that can perform some or all aspects or functionality of methods, circuitry, circuits, systems, or system components as set forth herein and according to embodiments of the disclosed subject matter.

For instance, embodiments of the disclosed subject matter can include a computer program product in the form of a non-transitory computer readable storage medium having stored thereon software instructions that, when executed by a processor, cause the processor to perform operations comprising: automatically calculate values for amounts of actual erosion based on real-time receipt of return signals indicative of amounts of actual erosion caused by a force other than mechanical friction, such as from high pressure, high temperature exhaust.

Embodiments of the disclosed subject matter can further include an optical sensor that has a body made of ablative material and having one or more optical waveguide portions, such as fiber-optic cables, embedded therein.

Embodiments also include an ablative panel having embedded therein a plurality of optical sensors. Optionally, the ablative panel may be removable from its foundation and thereby replaced with another ablative panel of same or similar type. Such removing and replacing may be performed due to a malfunction of one or more of the sensors or because the panel has ablated or eroded a certain amount.

Embodiments may include a method for detecting erosion caused by a force other than mechanical friction, where the method includes transmitting, with a first transmitter at a first time, a first transmitted light signal over a first optical waveguide; receiving, with a first receiver at a second time later than the first time, a first returned light signal resulting from transmitting the first transmitted light signal with the first transmitter, the first returned light signal being received over a second optical waveguide and establishing a baseline position; transmitting, with a second transmitter at a third time later than the second time, a second transmitted light signal over the first optical waveguide; and receiving, with a second receiver at a fourth time later than the third time, a second returned light signal resulting from transmitting the second transmitted light signal with the second transmitter, the second returned light signal indicative of an amount of erosion from said baseline position caused by a force other than mechanical friction. The method may further include calculating, with a processor, erosion data responsive to erosion from the baseline position taking place between the second time and the third time, the calculating based on the first returned light signal and the second returned light signal. In the method, the first transmitter may be the same as the second transmitter, the first receiver may be the same as the second receiver, and/or the first optical waveguide may be the same as the second optical waveguide. The erosion data may be used to determine a missile firing sequence, for example.

BRIEF DESCRIPTION OF THE DRAWINGS

Embodiments will hereinafter be described in detail below with reference to the accompanying drawings, wherein like reference numerals represent like elements. The accompanying drawings have not necessarily been drawn to scale. Any values dimensions illustrated in the accompanying graphs and figures are for illustration purposes only and may not represent actual or preferred values or dimensions. Where applicable, some features may not be illustrated to assist in the description of underlying features.

DESCRIPTION

Figure 1:
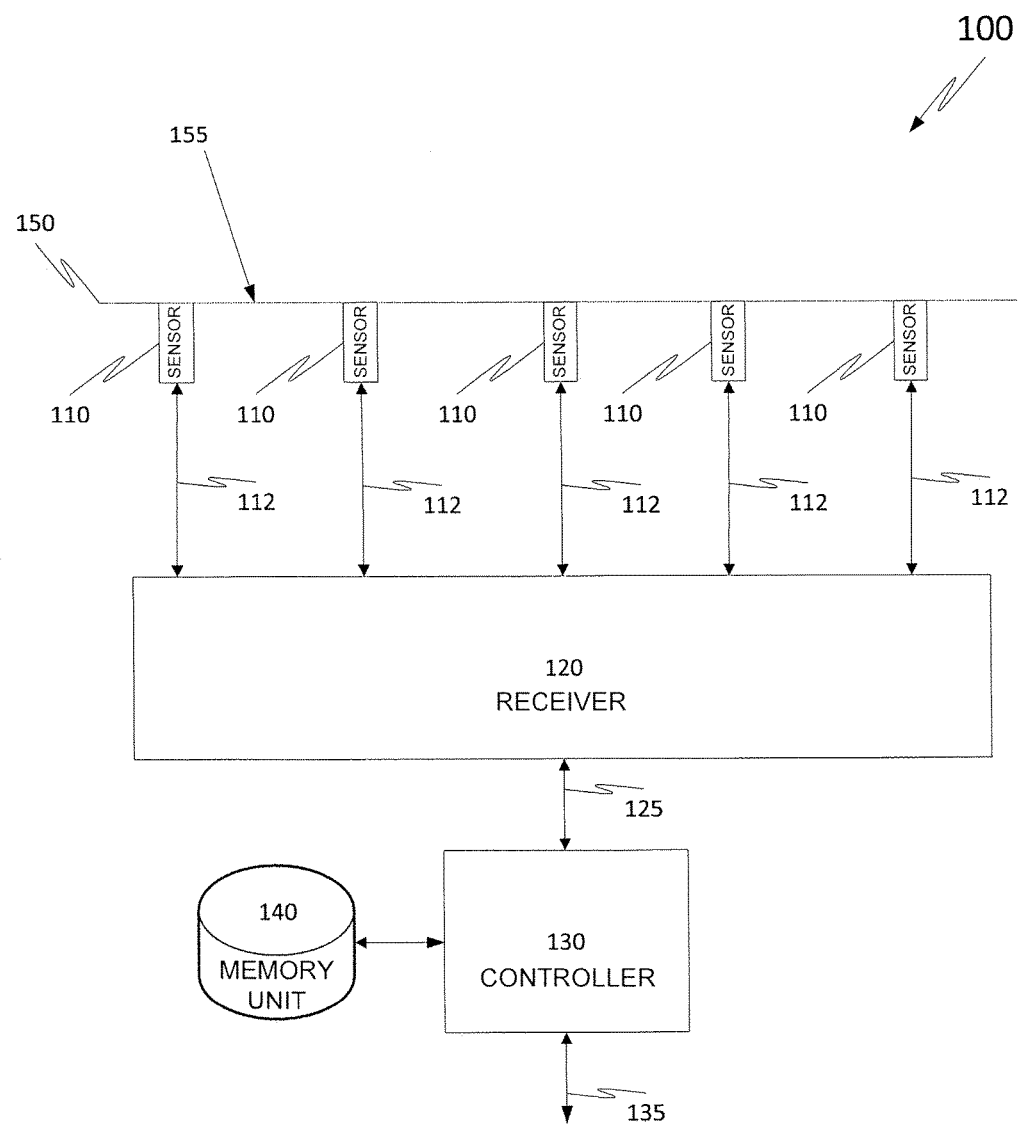
FIG. 1 is a block diagram of an erosion or ablation sensing or detection system according to embodiments of the disclosed subject matter.

The description set forth below in connection with the appended drawings is intended as a description of various embodiments of the disclosed subject matter and is not intended to represent the only embodiments in which the disclosed subject matter may be practiced. The description includes specific details for the purpose of providing a thorough understanding of the disclosed subject matter. However, it will be apparent to those skilled in the art that the disclosed subject matter may be practiced without these specific details. In some instances, well-known structures and components may be shown in block diagram form in order to avoid obscuring the concepts of the disclosed subject matter.

Generally speaking, embodiments of the disclosed subject matter include erosion sensors and systems, methods, and computer products thereof that are operative to determine and provide real time erosion or ablation data. This real time erosion or ablation data may be used, for example, without use of empirical test data, to determine an amount of erosion or ablation on an ablative surface, for instance, of a rocket or missile launch pad, of an exhaust management system, of an extraterrestrial vehicle, or of a fire detection system. Such ablation or erosion can be caused by a force or forces other than a mechanical friction force, such as by heat, fire, or high pressure gas (e.g., exhaust gas). Based on the amount of erosion or ablation, further actions may be taken, depending upon the particular application.

Sensor data can be gathered and used to perform one or more of the following operations: determine a sequence of operations; determine a next operation to take; generate an erosion model; determine existence of an unsafe condition; and determine that a portion or portion of a system needs to be replaced or refurbished.

In the case of a missile or rocket launching system, erosion or ablation sensors can be located at locations where a highest amount of erosion is expected to occur, for example, embedded into the ablative in the plenum and/or uptake portions of the gas management system (GMS). Sensor data can be gathered and used to perform one or more of the following operations: determine an optimal, ideal, desired, or safest cell firing sequence; determine a next operation to take (e.g., next cell to fire, safest cell to fire); generate a two-dimensional or three-dimensional erosion model of any portion or portions of the GMS, for instance; determine an optimal, safest, or desired missile load out configuration; determine that a missile cell is no longer safe to fire or that the GMS is no longer safe for firing of a missile; determine a need or a soon-to-be need to refurbish or replace a portion of the missile launching system, such as an ablative portion having embedded erosion sensors (e.g., collects erosion data for module refurbishment calculations). Embodiments of the disclosed subject matter can also increase a maximum firing count of a missile launching system, for example, by "evening out" firing from across the cells, as well as provide for more flexibility in load out possibilities.

FIG. 1 is a block diagram of an erosion or ablation sensing or detection system 100 according to embodiments of the disclosed subject matter.

System 100 can include a plurality of sensors or sensing devices 110 operatively coupled via respective conduits 112 to a receiver 120. Receiver 120 is operatively coupled to a controller 130 via electrical connection 125. System 100 can also include a memory unit 140, for example, a non-volatile memory, operatively coupled to controller 130. Controller 130 can be coupled via electrical connection or connections 135 to any suitable electronic component, such as a control panel, an output display, etc.

Figure 8:
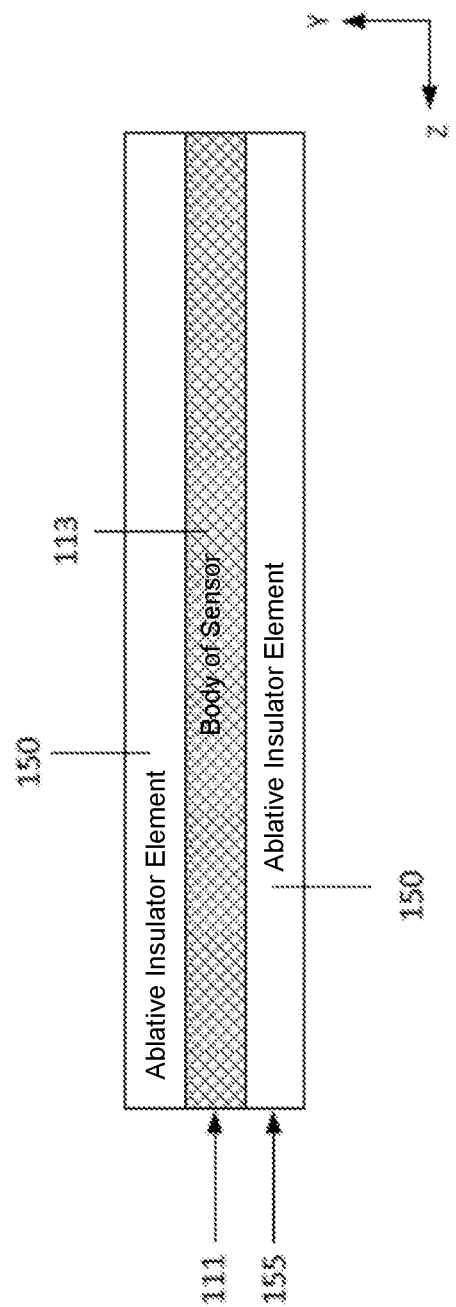
FIG. 8 is a cross-sectional view of an ablative insulator element according to embodiments of the disclosed subject matter.

Sensors 110 can be positioned relative to a front face 155 of an ablative insulator element 150 (e.g., a wall, a foundation, or a panel) that is to be subjected to an ablative or erosive force or forces, such as a force or forces other than a mechanical friction force (e.g., heat, fire, and/or high pressure gas). For example, optionally, the sensors 110 can be flush mounted with face 155, whereby a top face 111 of the sensor 110 is flush with face 155 and the body 113 of the sensor 110 is behind the face, embedded within the ablative element 150, as shown in FIG. 8. Alternatively, some or all of the sensors 110 may have a portion that protrudes slightly from face 155.

Sensors 110 can have bodies that are made of an ablative material, for example, MXB 360, MXBE-350, SLA-561V, or the like. Ablative insulator element 150 is also made of an ablative material, and, optionally, the sensor bodies and the ablative insulator element 150 may be made of the same ablative material. Alternatively, the sensor bodies and ablative insulator element 150 may be made of different ablative materials. Further, different portions of the ablative insulator element 150 may be made of different ablative materials (e.g., different materials used in ablative insulator elements in gas management system plenum and uptake portions) and consequentially, the sensor bodies may be made of different ablative materials.

Sensors 110 can be of any suitable type or configuration. For instance, sensors 110 can be optical fiber or cable sensors, optical waveguide sensors, electric inductance sensors, electrical continuity sensors, light reflection sensors (including laser reflectors), or a combination thereof. Moreover, optionally, all of the sensors 110 may be of a same type or configuration. Alternatively, some or all of the sensors 110 may be of different configurations or types.

Sensors 110 are operative such that as their ablative body erodes, their output signals change accordingly, or they otherwise output signals to reflect ablation or erosion thereof. Optionally, the output of each of the sensors 110 may be inversely proportional to the amount of erosion or ablation experienced by the sensors 110. In various embodiments, an output of each of the sensors 110 may be termed a return signal in that the signal was input at an input of the sensor 110, passed through the sensor 110, and output at an output of the sensor 110. For instance, in the case of a fiber optic sensor having a plurality of optical fibers embedded in an ablative body, a light signal may be received at an input of the sensor, passed along the embedded optical fiber, and output at an output of the sensor. As the ablative erodes, one or more of the fibers stops carrying light or a reduced amount of light is carried, the amount of outputted light for the particular optical fibers ceases or is reduced.

Incidentally, though FIG. 1 shows a plurality of sensors 110, alternatively, only one sensor may be implemented. For instance, only one sensor 110 may be used, and the sensor 110 may have a top face that is about the same size as face 155 to which the sensor 110 is coupled.

Receiver 120 is operatively coupled to the sensors 110, either electrically (including via inductance) or optically, depending upon the type and configuration of sensor 110. Receiver 120 can detect signals, for example, return signals from sensors 110 representative of an amount of ablation or erosion of the associated sensors 110 and the ablative insulator 150. For instance, in the case of an optical fiber sensor, fiber optic (FO) receiver 120 may receive light signals from the optical fibers. Optionally, in various embodiments, receiver 120 may be a transceiver and may also output signals to the sensors 110 for return thereof. As with the case of the optical fiber sensor, optionally, now fiber optic (FO) transceiver 120 may output light through the optical fibers and sense or detect return thereof of the light. Alternatively, light may be provided to the optical fibers via a light source different from the transceiver 120.

Receiver 120 can register return signal output characteristics from sensors 110, for instance an amount of light returning from the sensors 110, if any, an amount of current returning, if any, etc., and can determine an amount of erosion or ablation associated with each sensor 110. Such determination can be performed in real time or near real time. Based on the received signals, receiver 120 can calculate a thickness of and/or an amount of thickness reduction of the ablative material of the sensors 110 and/or of the ablative insulator 150, for example, and such thickness reduction can be indicative of an amount of erosion or ablation. Optionally, the receiver 120 may correlate or compare the receive signal characteristics to values in a lookup table stored in internal or external memory to determine an amount of erosion or ablation. Alternatively, in various embodiments, receiver 120 may pass on received signal characteristics data to another component, such as controller 130 to perform the calculations.

In various embodiments, receiver 120 may be operative to perform a calibration operation. Such calibration may be performed prior to subjecting the ablative insulator 150 and sensors 110 to ablative or erosive forces as described herein in order to obtain a baseline of the signals provided to receiver 120 from sensors 110. In various embodiments, the calibration operation may produce signals received at the receiver 120 indicative of no or substantially no ablation of the sensors 110. Optionally, the calibration operation may produce signals received at the receiver 120 merely indicative of a condition of the sensors 110 prior to subjecting the ablative insulator 150 and sensors 110 to ablative or erosive forces as described herein. The calibration or baseline data may be used for comparison against sensor 110 data received during or after a next or subsequent application of ablative or erosive forces. This during or after operation may be deemed "normal" operation of the system 100. In various embodiments, receiver 120 may include a data interpreter to interpret the signal characteristics from the sensors 110 and to output the data to an output file, store the data in memory, and/or output the data for use in creating a two- or three-dimensional erosion model, for instance. The erosion model may show representations of the ablative insulator 150 and the sensors 110 before and/or after subjecting the ablative insulator 150 and sensors 110 to ablative or erosive forces as described herein.

Optionally, in various embodiments, receiver 120 may be operative to output an alarm and/or an identifier when the amount of ablation or erosion exceeds a predetermined threshold. The identifier can indicate which of sensors 110 have ablated or eroded past the predetermined threshold.

Receiver 120 can send ablation or erosion data to controller or control unit 130 in real time. For instance, receiver 120 may send thickness data to controller 130. Controller 130 may have internal memory and/or may be coupled to a non-volatile storage unit 140. Erosion data received from the receiver 120 may be stored in the controller's internal memory and/or in non-volatile storage unit 140 for retrieval. Optionally, erosion data or other data may be stored in either of the aforementioned memories from a source other than sensors 110.

Controller 130 may use the received data from receiver 120 and/or stored data to perform one or more of the following operations: determining a sequence of operations, determining a next operation to take, generating an erosion model; determining existence of an unsafe condition, and determining that a portion or portion of a system needs to be replaced or refurbished. Optionally, control unit 130 may output an alarm and/or perform calibration operations, as indicated above for the receiver 120.

In various embodiments, controller 130 may include a data interpreter, rather than receiver 120, to interpret the signal characteristics from the sensors 110 and corresponding data from receiver 120, and to output the data to an output file, store the data in memory, and/or output the data, for example, for display and analysis, including to create an erosion model, a two- or three-dimensional erosion model. In the case of optical signals, the data interpreter can query light values and output the data to a data file, for instance. Thus, controller 130 may use the received data and/or stored data to create an erosion model. The erosion model may show representations of the ablative insulator 150 and the sensors 110 before and/or after subjecting the ablative insulator 150 and sensors 110 to ablative or erosive forces as described herein. Optionally, data from controller 130, such as the erosion model, may be output via conduit 135, for example, to a visual display on a control panel or test equipment (not explicitly shown). The erosion model may be representative of any portion or portions of the ablative insulator 150.

In the case of a missile or rocket launching system, optionally, controller 130 may be a launch control unit (LCU). In various embodiments, real ablative insulator 150 thickness may be sent in real time to the LCU for precise launch count calculations. The LCU may be operative to execute a launch control computer program (LCCP), for instance, based on the received real time erosion data and/or stored erosion data. Thus, LCU 130 may be operative to determine an optimal, ideal, desired, or safest cell firing sequence; determine a next cell to fire or a safest cell to fire; generate a two dimension or three-dimensional erosion model of any portion or portions of the GMS, for instance, such as the plenum or uptake or portions thereof; determine an optimal, safest, desired missile load out configuration; determine that a missile cell is no longer safe to fire or that the GMS is no longer safe for firing of a missile; determine a need or a soon-to-be need to refurbish or replace a portion of the missile launching system, such as an ablative portion having embedded erosion sensors.

Figure 2A:
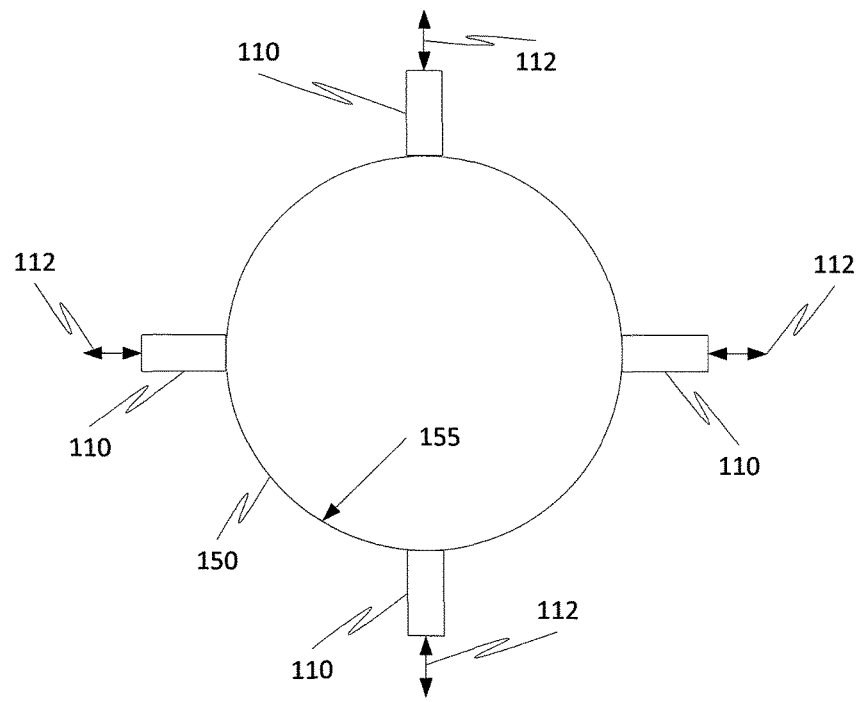
FIG. 2A is a block diagram of an end view of a portion of an erosion or ablation sensing or detection system according to embodiments of the disclosed subject matter.
Figure 2B:
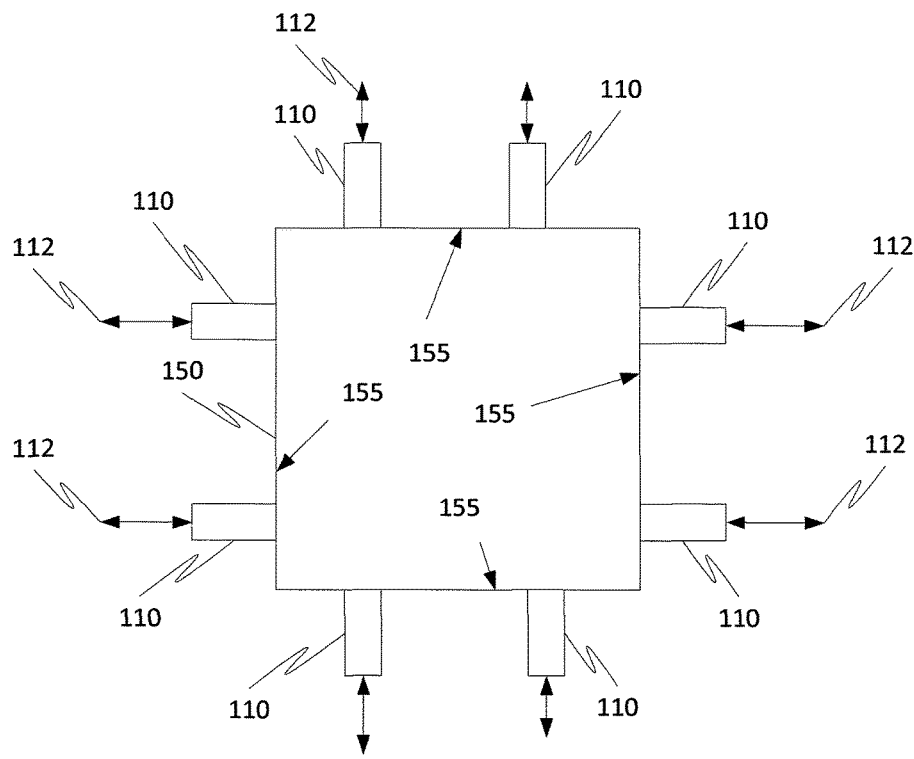
FIG. 2B is a block diagram of an end view of a portion of an erosion or ablation sensing or detection system according to another embodiment of the disclosed subject matter.

FIG. 2A is a block diagram of an end view of a portion of an erosion or ablation sensing or detection system according to embodiments of the disclosed subject matter. FIG. 2B is a block diagram of an end view of a portion of an erosion or ablation sensing or detection system according to another embodiment of the disclosed subject matter.

An ablative insulator 150 may take any suitable shape, a circle in FIG. 2A and a square in FIG. 2B. Thus, ablative or erosive forces as described herein may be experienced by face(s) 155 as such forces move generally in a direction into or out from the page. As can be seen from FIGS. 2A and 2B, sensors 110 as described herein may be positioned with respect to the face(s) 155 to sense or detect ablation or erosion thereof and to send signals or signal characteristics associated with such ablation or erosion to a receiver, such as a fiber optic (FO) transceiver for processing.

Figure 3:
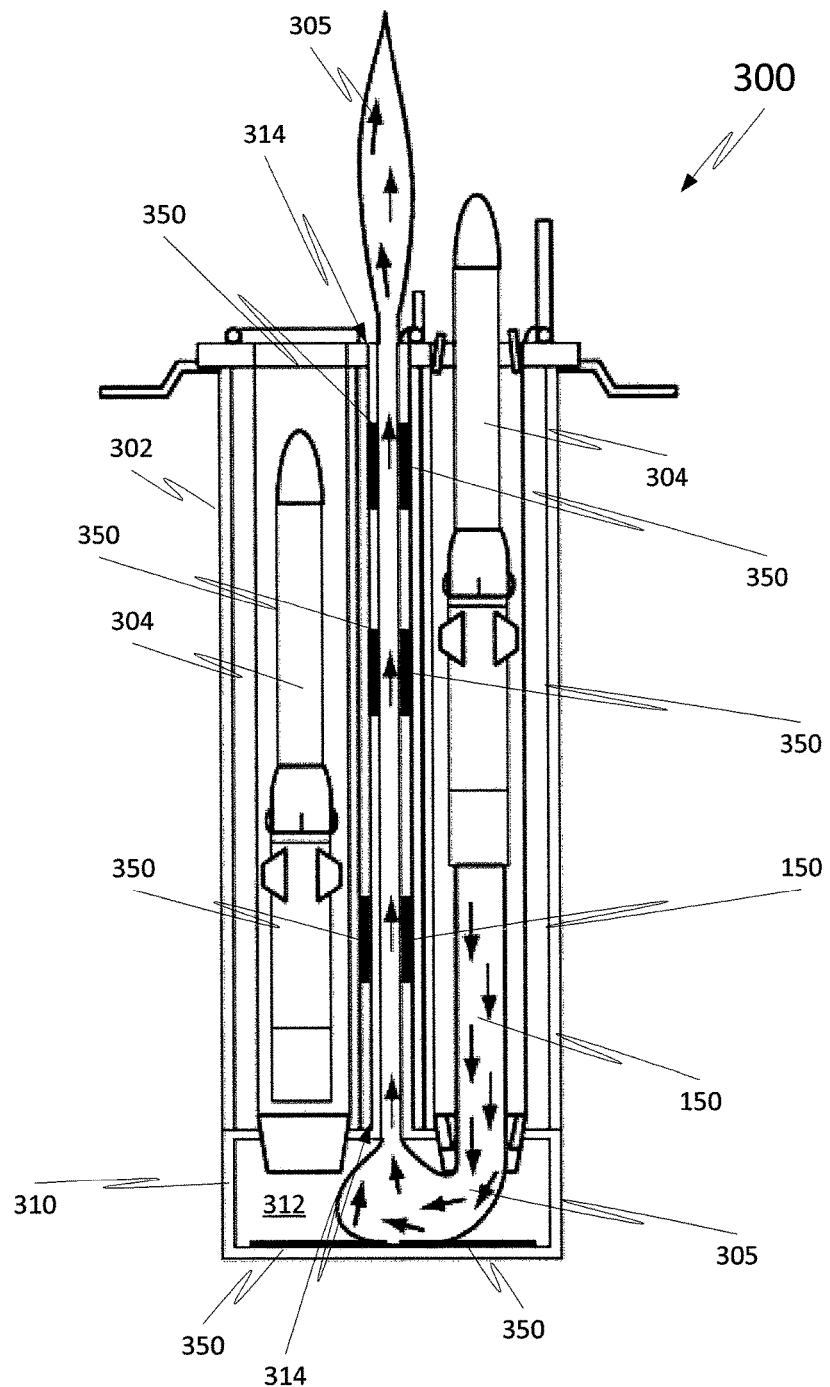
FIG. 3 is a diagram of a missile launching system according to embodiments of the disclosed subject matter.

FIG. 3 is a diagram of a missile launching system 300 according to embodiments of the disclosed subject matter. The missile launching system 300 shown in FIG. 3 is a vertical launch system (VLS), such as the MK41 launch system outfitted on a naval vessel (e.g., destroyer, submarine, cruiser, etc.) and can include a number of cells 302, arranged in a grid, for example, which can hold one or more missiles 304 ready for firing. Typically, each cell 302 can hold a number of different types of missiles, which can allow for load flexibility. Further, the missiles may be held in a canister, which may be held in a receptacle in the cell. Embodiments of the disclosed subject matter, however, are not limited to vertical launch systems and can include non-vertical launch systems. Further, embodiments are not limited to fixed launch systems, nor are they limited to naval vessels and can include any suitable launch system. In various embodiments, missile launch systems are hot launch systems where missiles ignite in the cells.

Missile launch systems, such as hot launch systems, can require some way of disposing of the missile heat and exhaust 305 as missiles are fired and the heat and exhaust 305 leave the cell. Accordingly, missile launch system 300 can employ a gas management system (GMS) 310 to dispose of the missile heat and exhaust 305 as shown in FIG. 3. The GMS may include a plenum portion 312 and an uptake portion 314. The plenum portion 312 is located below where a missile exhaust nozzle resides prior to firing, and the uptake portion 314 having an output portion to outside the vertical launching system 300. Further, if the missile 304 ignites in a cell without first exiting the launcher, the cell and launcher must withstand a full burn of the rocket motor and the tremendous heat generated without igniting the missiles in the adjacent cells. Accordingly, the cell and GMS can have surfaces which are covered with ablative material that can withstand—to a certain extent—the extreme temperature and high pressure. Portions (i.e., some or all) of the GMS may be made of ablative insulator material, such as MXB 360 for uptake portion 314 and MXBE-350 for plenum portion 312. Other materials may be used, such as FR-1, CD108-40, FM16771-F, FM16771-A, and MX-4926.

Nevertheless, though the ablative insulator material may withstand the heat and high pressure exhaust to a certain extent, this material may still be susceptible to erosion or ablation. Accordingly, to measure or sense an amount of erosion or ablation at various locations in the GMS 310, for instance, at locations where a highest amount of erosion is expected, sensors as described herein are embedded in or positioned on these portions of the GMS 310 to calculate or otherwise sense or determine an amount of erosion or ablation at these locations in the GMS 310.

For instance, sensors may be located in the plenum and/or uptake portions 312, 314. In various embodiments, the sensors may be embedded in or located on walls of these portions, or, optionally, embedded in or located on ablative insulator panels 350. Optionally, the panels 350 may be removed and replaced based on the amount of erosion or ablation. The sensors can be removably or fixedly coupled to the panels 350. Optionally, the sensors can have a body thereof made of a same or different material as the surrounding ablative material of the GMS 310 portion.

Figure 4A:
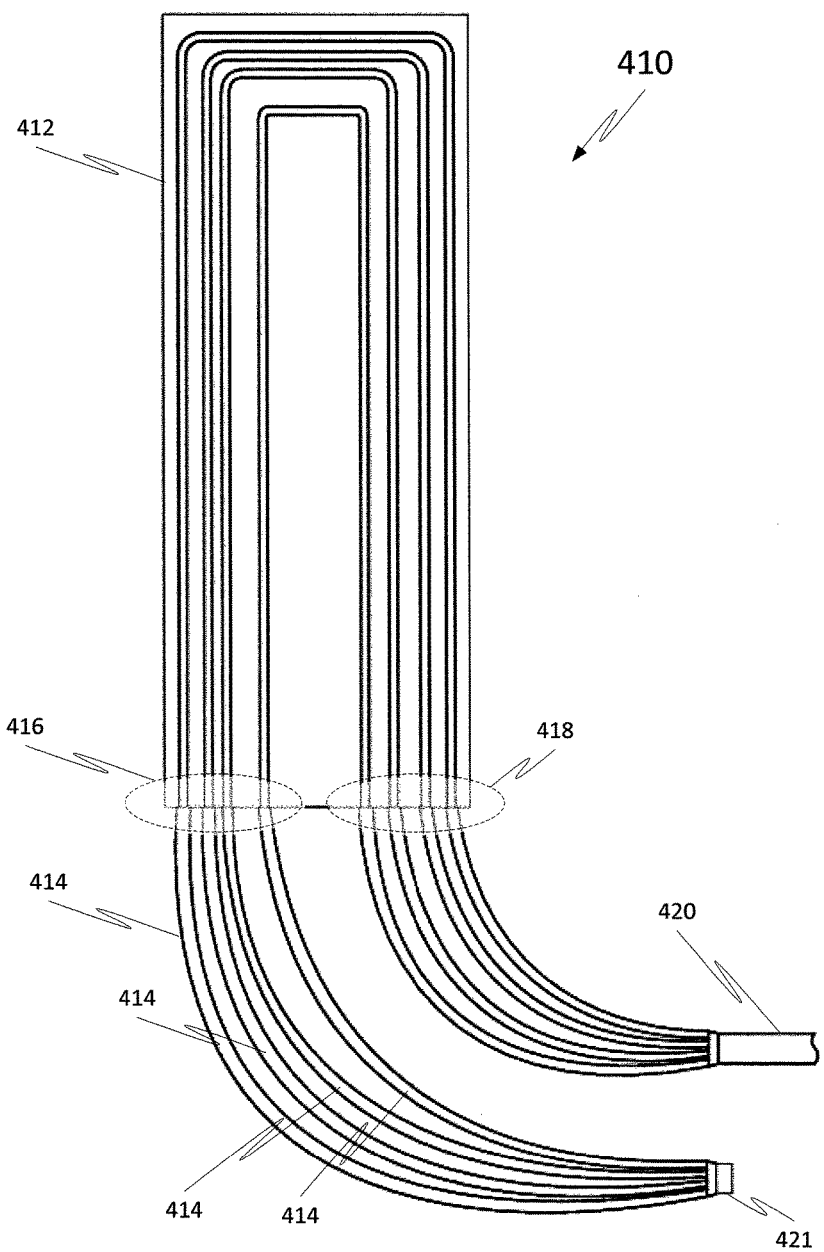
FIGS. 4A and 4B are side and perspective views, respectively, of an erosion sensor according to embodiments of the disclosed subject matter.
Figure 4B:
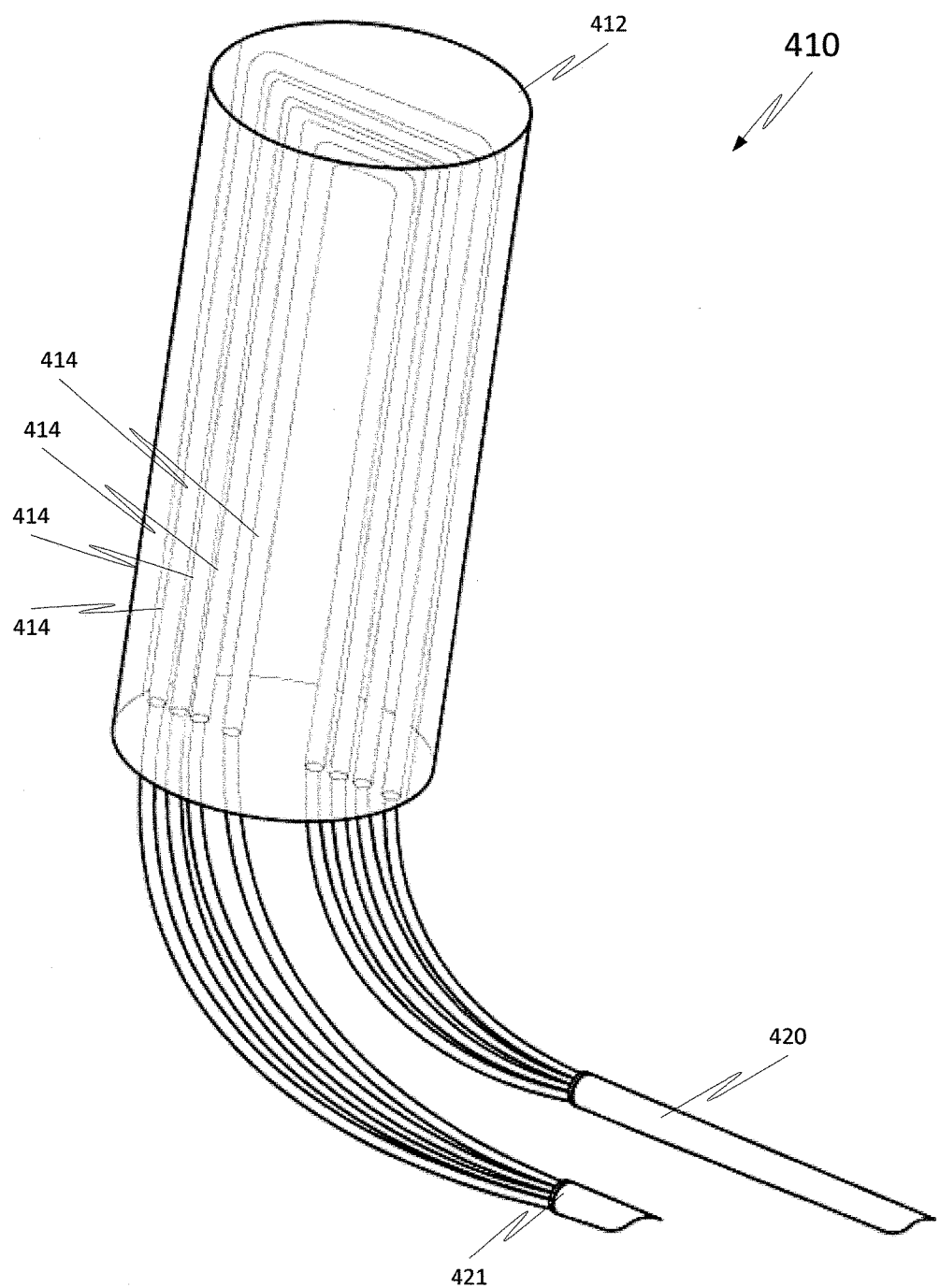

FIGS. 4A and 4B are side and perspective views, respectively, of an erosion sensor 410 according to embodiments of the disclosed subject matter.

Erosion sensor 410 is a fiber optical sensor having a plurality of discrete optical fibers or filaments 414 that pass light therethrough embedded in a body portion 412. The optical fibers 414 may be bundled to form cables 420, 421, and such cables can be operatively connected to a receiver, such as a fiber optic (FO) transceiver. The optical fibers 414 may be bent generally to form semi-rectangles. FIGS. 4A and 4B show four optical fibers, but any suitable number of fibers may be used, such as one, two, three, five, etc. Further, FIGS. 4A and 4B show the optical fibers being semi-rectangular, but embodiments may be semi-circular, semi-triangular, or some other configuration, for instance.

Body portion 412 of any suitable shape or size, such as a ½" diameter plug. Further, body portion 412 can be made of an ablative material such as described herein. Erosion sensor 410 may be flush embedded into a top face of an ablative insulator as described herein, and the body portion 412 can be of a same or different material as the ablative insulator into which it is embedded or to which it is otherwise affixed.

In operation, light signals may be input via 418 and the light may be returned or output via 416 or vice versa. As the ablative body erodes due to forces as described herein, one or more of the optical fibers can stop transmitting light. Thus, for light received at input 418 for each of the optical fibers, it may be the case that light is not output at output 416 for one or more of the optical fibers due to erosion or burning away of the fiber or fibers. The amount of light output at 416 can be registered at a receiver as described herein and used to quantify an amount of erosion or ablation associated with the sensor's 410 location. In an alternative embodiment, only one optical fiber may input light at 418, but light may be output at 416 via multiple optical fibers. Additionally, in an alternative embodiment, some or all of the optical fibers may be of a different type and thereby represent different frequencies with sufficient separation on the spectrum to differentiate in a combined output fiber/cable and then subject to de-multiplexing or decoding. In such as case, multiple sensing elements per optical fiber may be employed.

Figure 5:
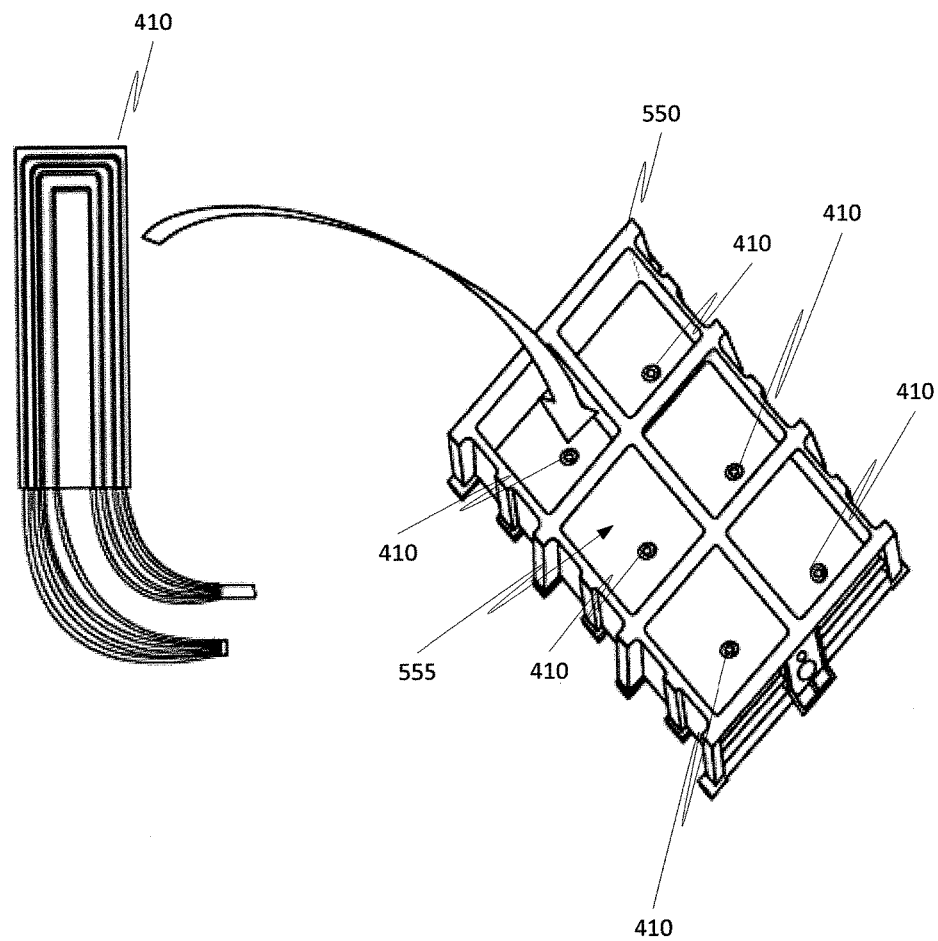
FIG. 5 shows a plurality of erosion sensors as shown in FIGS. 4A and 4B embedded in an ablative panel according to embodiments of the disclosed subject matter.

FIG. 5 shows a plurality of erosion sensors 410 as shown in FIGS. 4A and 4B embedded in an ablative panel 550 according to embodiments of the disclosed subject matter. As indicated previously, the sensors 410 may be flush embedded as shown in FIG. 5, into a front face 555 of the panel 550. Optionally, the panel 550 may be removably attached to a foundation, such as a wall portion of plenum or uptake portions of a GMS, by any suitable means, including screws, rivots, snap fit, epoxy, etc. The panel 550 may be removably attached its foundation so that it can be removed and replaced due to a malfunction of one or more of the sensors or because the panel has ablated or eroded a certain amount. As indicated previously, the body of the sensors 410 may or may not be of the same material as that of the panel 550.

Figure 6A:
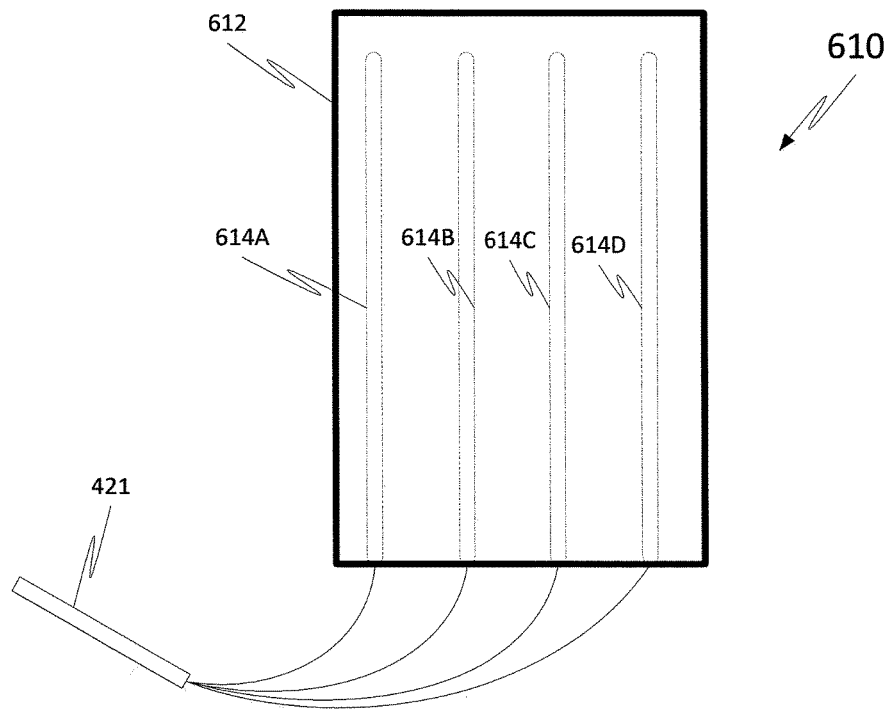
FIGS. 6A, 6B, and 6C show back, top, and bottom views, respectively, of an erosion sensor according to embodiments of the disclosed subject matter.
Figure 6B:
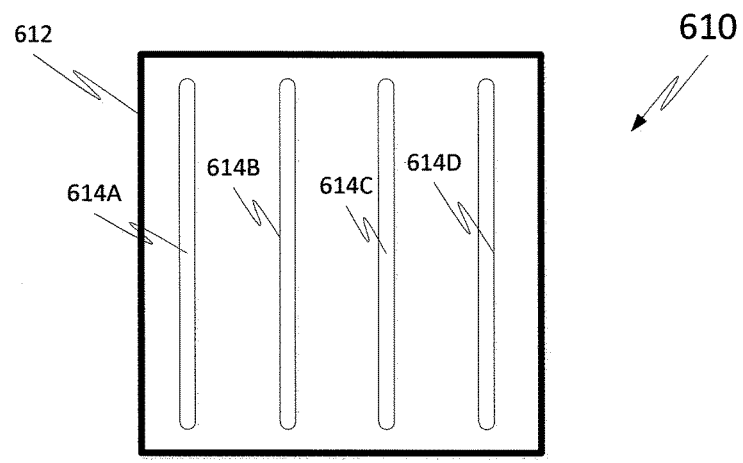
Figure 6C:
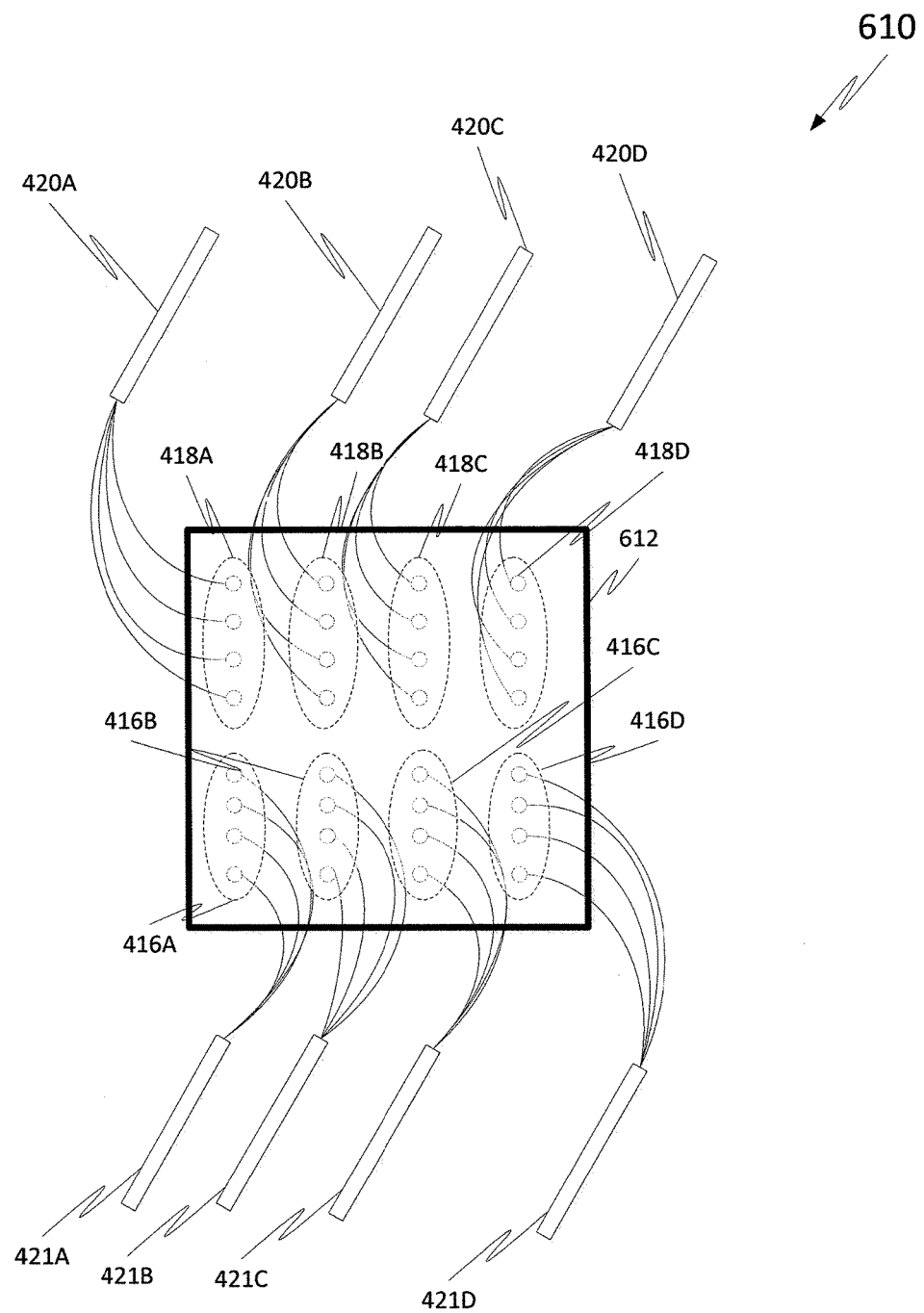

FIGS. 6A, 6B, and 6C show back, top, and bottom views, respectively, of a fiber optic erosion sensor 610 according to embodiments of the disclosed subject matter. Further, sensor 610 may have a side profile the same as or similar to as shown in FIG. 4A.

This sensor 610 is similar to the one shown in FIGS. 4A and 4B, but has a rectangular shaped body. Sensor 610 is also different from the sensor shown in FIGS. 4A and 4B in that it has a plurality of sets of bent semi-rectangles 614A through 614D. FIGS. 6A and 6B show four sets of optical fibers, but any suitable number may be used, such as one (as is the case with FIGS. 4A and 4B), two, three, five, etc. Further, any suitable number of optical fibers may be employed per set, such as one, two, three, four, five, etc. Additionally, the optical fibers can be in any suitable configuration, such as semi-rectangular, but embodiments may be semi-circular, semi-triangular, or some other configuration, for instance. Moreover, some of the sets may have different numbers of optical fibers and/or different geometries as indicated above. Alternatively, each set may have the same number of optical fibers and/or geometric configurations.

Each set may be grouped together to form a cable 421, or all of the sets may be grouped together to form the cable 421. As shown in FIG. 4C, each set of optical fibers can has inputs 418A-418D for the plurality of fibers and outputs 416A-416D for the corresponding fibers. The respective input and output fibers may be bundled to form cables 420A-420D and 421A-421D, respectively. Discrete sensing interfaces may be provided for each set of output fibers 416A-416D. Accordingly, the sets of optical fibers may provide redundant capabilities and/or may be used to detect layers of erosion and erosion areas within a sensor grid.

Figure 7:
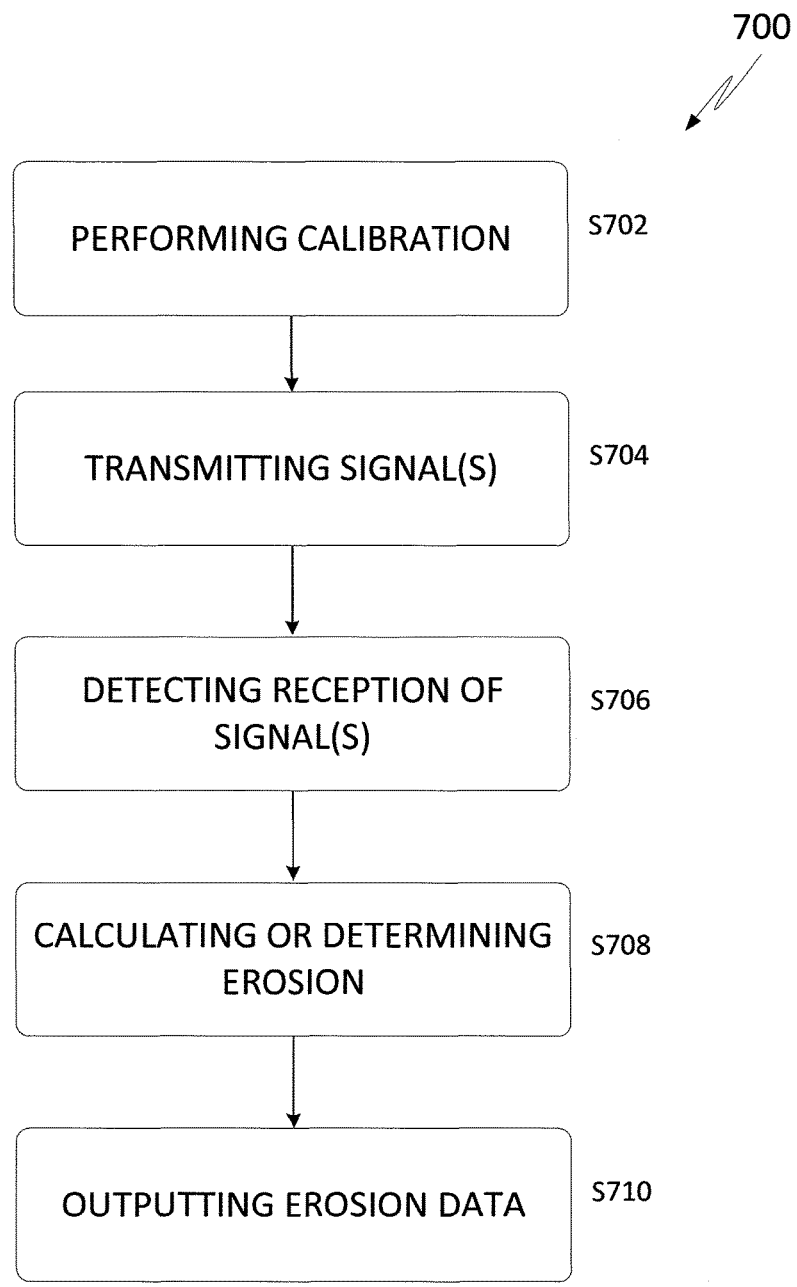
FIG. 7 is a flow chart for a method according to embodiments of the disclosed subject matter.

FIG. 7 is a flow chart for a method 700 according to embodiments of the disclosed subject matter. The method 700 may be implemented using a non-transitory computer readable storage medium having stored thereon software instructions that, when executed by a processor, cause a processor to perform the steps or operations set forth herein.

The method 700 can be comprised of electronically receiving or detecting in real time, for example, a first plurality of signals indicative of amounts of actual erosion caused by a force other than mechanical friction S706. Optionally, the method 700 can comprise transmitting signals prior to the reception of the signals. Based on the received signals, the method can automatically calculate values for amounts of actual erosion to produce erosion data S708. Optionally, the method 700 can include outputting erosion data, for example, to a storage unit, to a display, and/or for further processing S710. In various embodiments, the erosion data can be output to perform one or more of the following operations: determining a sequence of operations based on said erosion data, determining a next operation to take based on said erosion data, generating an erosion model, electronically performing one or more of determining a missile firing sequence, determining missile load out configuration, and determining a need or a soon-to-be need to refurbish a portion of the vertical or non-vertical missile launching system. Optionally, in various embodiments, a calibration operation may be performed S702 prior to the detecting step or the optional transmitting step. The calibration can include performing a baseline operation to determine a prior amount of erosion inclusive of no erosion or determining signals indicative of the prior amount of erosion.

It will be appreciated that portions (i.e., some, none, or all) of the circuits, circuitry, modules, processes, sections, systems, and system components described herein can be implemented in hardware, hardware programmed by software, software instructions stored on a non-transitory computer readable medium or a combination of the above.

For example, the processor can include, but is not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C++, C#.net or the like. The instructions can also comprise code and data objects provided in accordance with, for example, the Visual Basic™ language, or another structured or object-oriented programming language. The sequence of programmed instructions and data associated therewith can be stored in a non-transitory computer-readable medium such as a computer memory or storage device which may be any suitable memory apparatus, such as, but not limited to ROM, PROM, EEPROM, RAM, flash memory, disk drive and the like.

Furthermore, the circuits, circuitry, modules, processes, systems, sections, and system components can be implemented as a single processor or as a distributed processor. Further, it should be appreciated that the steps mentioned above may be performed on a single or distributed processor (single and/or multi-core). Also, the processes, modules, and sub-modules described in the various figures of and for embodiments above may be distributed across multiple computers or systems or may be co-located in a single processor or system. Exemplary structural embodiment alternatives suitable for implementing the circuits, circuitry, modules, sections, systems, system components, means, or processes described herein are provided below.

The circuits, circuitry, modules, processors, systems, or system components described herein can be implemented as a programmed general purpose computer, an electronic device programmed with microcode, a hardwired analog logic circuit, software stored on a computer-readable medium or signal, an optical computing device, a networked system of electronic and/or optical devices, a special purpose computing device, an integrated circuit device, a semiconductor chip, and a software module or object stored on a computer-readable medium or signal, for example.

Embodiments of the method and system (or their components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a non-transitory computer readable medium).

Furthermore, embodiments of the disclosed method, system, and computer program product may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the user interface and/or computer programming arts.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicants intend to embrace all such alternatives, modifications, equivalents, and variations that are within the spirit and scope of the present invention.

What is claimed is:

1. An ablation detection system for detecting ablation caused by high temperature, high pressure exhaust, comprising:
    at least one ablative panel, the at least one ablative panel having embedded therein a plurality of fiber optic sensors, each configured to provide a return signal having an output level inversely proportional to an amount of ablation sustained by the respective sensor due to exposure to the high temperature, high pressure exhaust;
    a receiver to detect return signal output characteristics from the fiber optic sensors, the return signal output characteristics being indicative of the amount of ablation sustained by the fiber optic sensors due to exposure to the high temperature, high pressure exhaust,
        the receiver being operative to calculate the amount of ablation based on the detected return signal output characteristics, and
        the receiver being operative to output an identifier when the amount of ablation exceeds a predetermined threshold, the identifier indicating which of the plurality of fiber optic sensors have ablated past the predetermined threshold; and
    a control unit operative to receive ablation data associated with the amount of ablation from the receiver, each of the plurality of fiber optic sensors being associated with a respective one of a plurality of launch cells and the control unit being operative to perform one or more operations based on the ablation data, the one or more operations including at least one of: determining a sequence of operations, determining a next operation to take, generating an erosion model, determining existence of an unsafe condition, determining that a portion should be replaced or refurbished, outputting an alarm, performing calibration operations, and outputting data to a display,
    wherein each of the fiber optic sensors includes a plurality of discrete optic fibers configured to pass light therethrough, the plurality of discrete optic fibers being disposed in a body portion of a respective one of the fiber optic sensors, and
    wherein each fiber optic sensor comprises a body made of an ablative material, a top face of the body being flush with a front face of the at least one ablative panel such that the top face is exposed to an external environment prior to ablation of the fiber optic sensor.

2. The ablation detection system according to claim 1, wherein the return signal output characteristics include an amount of light.

3. The ablation detection system according to claim 1, wherein the at least one ablative panel has the plurality of fiber optic sensors substantially permanently embedded therein.

4. The ablation detection system according to claim 1, wherein said receiver is a transceiver and outputs a signal to an input of the fiber optic sensors, the signal being a plurality of discrete light signals.

5. The ablation detection system according to claim 1, wherein said receiver is operative to perform a calibration operation to determine a return signal output characteristic of the fiber optic sensors indicative of no or substantially no ablation, the return signal output characteristic indicative of no or substantially no ablation being used by said receiver for comparison against return signal output characteristics in a normal operation mode to determine the amount of ablation.

6. The ablation detection system according to claim 1, wherein ablation to the fiber optic sensors is caused by a force or forces other than a mechanical friction force, and wherein said receiver is operative to calculate a thickness of and/or an amount of thickness reduction of at least one ablative panel in which at least one of the fiber optic sensors is embedded.

7. The ablation detection system according to claim 1, wherein the receiver is further operative to output an alarm when the amount of ablation exceeds the predetermined threshold.

8. The ablation detection system of claim 1, wherein the return signal is based on light passing through the fiber optic sensors.

9. The ablation detection system of claim 1, wherein the one or more operations comprise determining whether a cell is safe for firing, a cell firing order, and/or a next cell to fire of the launch cells.

10. The ablation detection system of claim 9,
wherein the launch cells are vertical launch cells, and
wherein each of the plurality of fiber optic sensors is embedded in a surface of a respective one of the plurality of vertical launch cells.

11. The ablation detection system of claim 1, wherein each of the discrete optic fibers are disposed in a semi-rectangular arrangement.

12. The ablation detection system of claim 1, wherein
the body made of the ablative material is adapted to measure ablation caused by a force other than mechanical friction including ablation caused by high temperature, high pressure exhaust.

13. The ablation detection system of claim 12, wherein the ablative material is one or more of MXB 360, MXBE-350, FR-1, CD108-40, FM16771-F, FM16771-A, and MX-4926.

14. The ablation detection system of claim 1, wherein the control unit either includes a non-volatile memory or is operatively coupled to a non-volatile memory, the control unit storing the received ablation data in the non-volatile memory, the stored ablation data being used to perform refurbishing calculations to determine whether one or more components of the system should be refurbished or replaced.

15. The ablation detection system of claim 1, wherein the plurality of fiber optic sensors protrude above a surface of the at least one ablation panel.

* * * * *